(12) United States Patent
Beals et al.

(10) Patent No.: US 10,142,910 B2
(45) Date of Patent: *Nov. 27, 2018

(54) GLOBAL COMMUNICATION NETWORK

(71) Applicant: Google Inc., Mountain View, CA (US)

(72) Inventors: Travis Roland Beals, Mountain View, CA (US); Christopher Richard Uhlik, Danville, CA (US)

(73) Assignee: Google LLC, Mountain View, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 15/296,171

(22) Filed: Oct. 18, 2016

(65) Prior Publication Data
US 2017/0041853 A1 Feb. 9, 2017

Related U.S. Application Data

(63) Continuation of application No. 15/157,331, filed on May 17, 2016, now Pat. No. 9,503,176, which is a
(Continued)

(51) Int. Cl.
*H04B 7/185* (2006.01)
*H04W 40/20* (2009.01)
(Continued)

(52) U.S. Cl.
CPC ......... *H04W 40/20* (2013.01); *H04B 7/1851* (2013.01); *H04B 7/18521* (2013.01); *H04L 45/02* (2013.01); *H04W 84/06* (2013.01)

(58) Field of Classification Search
CPC .................................................. H04W 40/20
See application file for complete search history.

(56) References Cited

U.S. PATENT DOCUMENTS 5,666,648 A * 9/1997 Stuart ............... H04B 7/18576
342/352
5,979,830 A * 11/1999 Kellermeier ......... B64G 1/1085
244/158.8
(Continued)

FOREIGN PATENT DOCUMENTS

WO 2001001710 A1 1/2001
WO 2002087112 A2 10/2002
(Continued)

OTHER PUBLICATIONS

European Search Report for the related EP Application No. 15796797.7 dated Oct. 13, 2017.
(Continued)

*Primary Examiner* — Ankur Jain
(74) *Attorney, Agent, or Firm* — Honigman Miller Schwartz and Cohn LLP

(57) ABSTRACT

A communication system allows communication between two users separated by a long distance includes a source ground station, a constellation, one or more linking-gateways, and a destination ground station. The constellation includes groups of communication devices orbiting or traveling around the earth. A first communication device of a first group of communication devices is in communication with the source ground station and receives a communication from the source ground station. The linking-gateway is in communication with at least the first and a second group of communication devices. The linking-gateway receives the communication from the first group of communication devices and sends the communication to a second communication device of the second group of communication devices. The destination ground station is in communication with the second group of communication devices, the destination ground station receiving the communication from a
(Continued)

communication device of the second group of communication devices.

22 Claims, 12 Drawing Sheets

Related U.S. Application Data continuation of application No. 14/229,084, filed on Mar. 28, 2014, now Pat. No. 9,369,198.

(51) Int. Cl.
    *H04L 12/751*     (2013.01)
    *H04W 84/06*     (2009.01)

(56) References Cited

U.S. PATENT DOCUMENTS

| | | | |
|---|---|---|---|
| 6,078,810 A * | 6/2000 | Olds | H04B 7/195 455/12.1 |
| 6,339,707 B1 * | 1/2002 | Wainfan | H04B 7/18578 455/12.1 |
| 6,628,941 B2 | 9/2003 | Knoblach et al. | |
| 7,203,491 B2 | 4/2007 | Knoblach et al. | |
| 7,356,390 B2 | 4/2008 | Knoblach et al. | |
| 7,653,349 B1 * | 1/2010 | Patel | H04H 20/426 342/457 |
| 7,801,522 B2 | 9/2010 | Knoblach et al. | |
| 8,320,829 B1 | 11/2012 | Clebowicz et al. | |
| 8,644,789 B2 | 2/2014 | Knoblach et al. | |
| 8,825,232 B2 | 9/2014 | Knoblach et al. | |
| 9,519,045 B2 | 12/2016 | Knoblach et al. | |
| 9,632,503 B2 | 4/2017 | Knoblach et al. | |
| 9,643,706 B2 | 5/2017 | Knoblach et al. | |
| 9,658,618 B1 | 5/2017 | Knoblach et al. | |
| 9,678,193 B2 | 6/2017 | Knoblach et al. | |
| 9,823,663 B2 | 11/2017 | Knoblach et al. | |
| 9,908,608 B2 | 3/2018 | Knoblach et al. | |
| 9,964,629 B2 | 5/2018 | Knoblach et al. | |
| 2002/0072361 A1 | 6/2002 | Knoblach et al. | |
| 2003/0109281 A1 | 6/2003 | Knoblach et al. | |
| 2005/0014499 A1 | 1/2005 | Knoblach et al. | |
| 2007/0155320 A1 | 7/2007 | Knoblach et al. | |
| 2007/0184810 A1 | 8/2007 | Knoblach et al. | |
| 2008/0299990 A1 | 12/2008 | Knoblach et al. | |
| 2010/0279604 A1 * | 11/2010 | Wood | H04B 7/18521 455/12.1 |
| 2011/0286325 A1 * | 11/2011 | Jalali | H04B 7/18506 370/221 |
| 2012/0018585 A1 * | 1/2012 | Liu | B64G 1/1007 244/158.6 |
| 2012/0263042 A1 * | 10/2012 | Natarajan | H04B 7/18584 370/238 |
| 2013/0017732 A1 * | 1/2013 | Parke | H01R 13/641 439/660 |
| 2013/0136055 A1 * | 5/2013 | Youssefzadeh | H04B 7/18528 370/324 |
| 2013/0177321 A1 * | 7/2013 | DeVaul | H04B 10/1129 398/115 |
| 2013/0231106 A1 | 9/2013 | Knoblach et al. | |
| 2014/0341586 A1 * | 11/2014 | Wyler | H04B 10/118 398/115 |
| 2014/0367511 A1 | 12/2014 | Knoblach et al. | |
| 2015/0309157 A1 | 10/2015 | Knoblach et al. | |
| 2016/0185435 A1 | 6/2016 | Knoblach | |
| 2016/0196757 A1 | 7/2016 | Knoblach | |
| 2016/0214716 A1 | 7/2016 | Knoblach et al. | |
| 2016/0378119 A1 | 12/2016 | Knoblach et al. | |
| 2017/0057607 A1 | 3/2017 | Knoblach et al. | |
| 2017/0057608 A1 | 3/2017 | Knoblach et al. | |
| 2017/0083019 A1 | 3/2017 | Knoblach et al. | |
| 2017/0108578 A1 | 4/2017 | Knoblach et al. | |
| 2017/0160741 A1 | 6/2017 | Knoblach et al. | |
| 2018/0194449 A1 | 7/2018 | Knoblach et al. | |

FOREIGN PATENT DOCUMENTS

| | | |
|---|---|---|
| WO | WO-2004002016 A2 | 12/2003 |
| WO | 2005032936 A2 | 4/2005 |
| WO | WO-2013130778 A1 | 9/2013 |
| WO | 2016105522 A1 | 6/2016 |
| WO | 2016109677 A1 | 7/2016 |
| WO | 2016105523 A1 | 10/2016 |

OTHER PUBLICATIONS

Australian Examination Report for Application No. 2015264742 dated Jan. 5, 2017.
International Search Report and Written Opinion for related application No. PCT/US2015/012388 dated Jan. 4, 2016.

* cited by examiner

GLOBAL COMMUNICATION NETWORK

CROSS REFERENCE TO RELATED APPLICATIONS

This U.S. patent application is a continuation of, and claims priority under 35 U.S.C. § 120 from, U.S. patent application Ser. No. 15/157,331, filed on May 17, 2016, which is a continuation of U.S. patent application Ser. No. 14/229,084, filed on Mar. 28, 2014. The disclosures of these prior applications are considered part of the disclosure of this application and are hereby incorporated by reference in their entireties.

TECHNICAL FIELD

This disclosure relates to a global communication network.

BACKGROUND

A communication network is a large distributed system for receiving information (signal) and transmitting the information to a destination. Over the past few decades the demand for communication access has dramatically increased. Although conventional wire and fiber landlines, cellular networks, and geostationary satellite systems have continuously been increasing to accommodate the growth in demand, the existing communication infrastructure is still not large enough to accommodate the increase in demand. In addition, some areas of the world are not connected to a communication network and therefore cannot be part of the global community where everything is connected to the internet.

Satellites and high-altitude communication balloons are used to provide communication services to areas where wired cables cannot reach. Satellites may be geostationary or non-geostationary. Geostationary satellites remain permanently in the same area of the sky as viewed from a specific location on earth, because the satellite is orbiting the equator with an orbital period of exactly one day. Non-geostationary satellites typically operate in low- or mid-earth orbit, and do not remain stationary relative to a fixed point on earth; the orbital path of a satellite can be described in part by the plane intersecting the center of the earth and containing the orbit. Each satellite may be equipped with communication devices called inter-satellite links (or, more generally, inter-device links) to communicate with other satellites in the same plane or in other planes. The communication devices allow the satellites to communicate with other satellites. These communication devices are expensive and heavy. In addition, the communication devices significantly increase the cost of building, launching and operating each satellite; they also greatly complicate the design and development of the satellite communication system and associated antennas and mechanisms to allow each satellite to acquire and track other satellites whose relative position is changing. Each antenna has a mechanical or electronic steering mechanism, which adds weight, cost, vibration, and complexity to the satellite, and increases risk of failure. Requirements for such tracking mechanisms are much more challenging for inter-satellite links designed to communicate with satellites in different planes than for links, which only communicate with nearby satellites in the same plane, since there is much less variation in relative position. Similar considerations and added cost apply to high-altitude communication balloon systems with inter-balloon links.

SUMMARY

One aspect of the disclosure provides a communication system including a source ground station, a constellation of communication devices, one or more linking-gateways, and a destination ground station. A ground station may be a gateway or a user terminal, and such ground station may be located on the ground, on a ship, or on an aircraft. The constellation of communication devices includes groups of communication devices orbiting the earth. Each group has an orbital path or trajectory (plane) different from another group. A first communication device of the first group is in communication with the source ground station and receives communication from the source ground station. The linking-gateway is in communication with at least the first and second groups of communication devices. The linking-gateway receives the communication from the first group of communication devices and sends the communication to a second communication device of the second group of communication devices. The destination ground station is in communication with the second group of communication devices. The destination ground station receives the communication from a communication device of the second group of communication devices.

Implementations of the disclosure may include one or more of the following features. In some implementations, the source ground station receives the communication from a first user through a cabled or fiber optic or a wireless radio-frequency connection, and the destination ground station transmits the communication to a second user through a cabled or fiber optic or a wireless radio-frequency connection. One or both users may be data centers or other computing facilities. Other implementations are possible as well, such as free-space optical communications or combinations of free-space optical, cabled, wireless radio-frequency, and fiber optic communications between users and gateways. The communication devices may include communication balloons and/or satellites or other high-altitude devices capable of communicating, such as manned or unmanned aircraft. In some examples, the linking-gateway is moving across the earth and may be on an airplane, a boat, a train, or any other moving object.

In some examples, a communication originates from a user near a source ground station having the first group of communication devices (e.g., orbiting the earth in a plane) as its nearest group of communication devices. The source ground station sends the communication to the first group of communication devices. Communication devices within the first group of communication devices may send the communication between communication devices (e.g., in a serial fashion via inter-device links) to reach a nearest linking-gateway. The linking-gateway may be one of several linking-gateways located in a region (e.g., the North or South Pole of the earth) where multiple groups of communication devices cross paths. A communication device of the first group of communication devices sends the communication to the linking-gateway, which then sends the communication to a nearest communication device of the second group of communication devices. Communication devices within the second group of communication devices may send the communication between communication devices (e.g., in a serial fashion via inter-device links) to reach the destination ground station. In some examples, the second group of communication devices relays the communication via a second linking-gateway to a third group of communication devices. This could be repeated as many times as necessary to reach a final group of communication devices, which then send the communication to the second ground station.

In some implementations, a current communication device in possession of the communication is in communication with a forward communication device within the orbital path or trajectory (plane) of its group of communication devices and a rearward communication device within the orbital path or trajectory (plane) of its group of communication devices via inter-device links. The current communication device, forward communication device, and the rearward communication device are within the same group of communication devices. After the first communication device receives the communication, the first communication device may send the communication via an inter-device link to the forward communication device or the rearward communication device. The communication device receiving the communication may forward the communication to the linking-gateway.

The system may further include a data processing device in communication with some or all of the source ground stations, the constellation of communication devices, the linking-gateway and the destination ground station. The data processing device determines a path of the communication from a source in communication with the source ground station to a destination in communication with the destination ground station. In some examples, the data processing device determines the path based on at least one of a border gateway protocol, an interior gateway protocol, maximum flow algorithm, or shortest path algorithm. Additionally or alternatively, the data processing device may determine the path based on a scoring function utilizing one or more of a distance between the source and the destination, a capacity of the inter-device link between two devices, an operational status of a communication device, and a signal strength of a communication device. The scoring function may be based on additional or different factors that allow the data processing device to determine an efficient or lowest latency path. The operational status of a communication device may include an active status or an inactive status of the communications device (for example, of the communication device as a whole or one or more individual components of the communication device). As such, the determined path may avoid inactive communication devices.

Another aspect of the disclosure provides a method of communication. The method includes determining a path of a communication from a source ground station to a destination ground station through a constellation of communication devices including groups of communication devices orbiting the earth. Each group has an orbital path or trajectory different from another group. The method also includes instructing the source ground station to send the communication to a first communication device of a first group of communication devices and instructing the first group of communication devices to send the communication to a nearest linking-gateway. The method further includes instructing the linking-gateway to send the communication to a second communication device of a second group of communication devices and instructing the second group of communication devices to send the communication to the destination ground station.

In some implementations, the method includes determining the path based on at least one of a border gateway protocol, an interior gateway protocol, a maximum flow algorithm, or a shortest path algorithm. Additionally or alternatively, the method includes determining the path based on a scoring function utilizing one or more of a distance between the source and the destination, a capacity of an inter-device link between two devices, an operational status of a communication device, and a signal strength of a communication device. The operational status of a communication device may include an active status or an inactive status of the communications device (for example, of the communication device as a whole or one or more individual components of the communication device). In some examples, the source ground station receives the communication from a first user and the destination ground station transmits the communication to a second user. The communication devices may include communication balloons and/or satellites. Moreover, the linking-gateway may be moving across the earth. In some examples, the method includes determining a position of the linking-gateway.

In some implementations, the method further includes instructing a current communication device with possession of the communication to send the communication to a forward or rearward communication device within the orbital path or trajectory of the current communication device and within the same group of communication devices as the current communication device. The method may further include instructing the forward or rearward communication device receiving the communication to send the communication to the linking-gateway. Moreover, the source ground station may receive the communication from a first user through a cabled or fiber optic or a wireless radio frequency connection and the destination ground station may transmit the communication to a second user through a cabled or fiber optic or wireless radio-frequency communication. Other implementations are possible as well, such as free-space optical communications or combinations of free-space optical, cabled, wireless radio-frequency, and fiber optic communications between users and gateways.

Yet another aspect of the disclosure provides a communication system including a device in communication with a source ground station, a constellation of communication devices, a linking-gateway and a destination ground station. The constellation of communication devices includes groups of communication devices orbiting the earth or traveling around the earth. Each group has an orbital path or trajectory different from another group. A first communication device of a first group of communication devices is in communication with the source ground station. The linking-gateway is in communication with the first group of communication devices and a second group of communication devices. The destination ground station is in communication with the second group of communication devices. The data processing device determines a path of a communication from the source ground station to the destination ground station through the constellation of communication devices and the linking-gateway. The data processing device also instructs the source ground station to send the communication to the first communication device of the first group of communication devices and instructs the first group of communication devices to send the communication to the linking-gateway. The data processing device further instructs the linking-gateway to send the communication to a second communication device of the second group of communication devices and instructs the second group of communication devices to send the communication to the destination ground station.

In some implementations, the source ground station receives the communication from a first user through a cabled or fiber optic connection or a wireless radio-frequency connection and the destination ground station transmits the communication to a second user through a cabled or fiber optic connection or a wireless radio-frequency connection. The communication devices may include high-altitude communication balloons or satellites. Moreover, the linking-gateway may be moving across the earth. The current communication device having possession of the communication is in communication with a forward communication device within the orbital path or trajectory of its group of communication devices and a rearward communication device within the orbital path or trajectory of its group of communication devices via inter-device links. The current communication device, forward communication device, and the rearward communication device are within the same group of communication devices. After the first communication device receives the communication, the first communication device may send the communication via an inter-device link to the forward communication device or the rearward communication device. The communication device receiving the communication may forward the communication to the linking-gateway, which may be moving across the earth. For example, the linking-gateway may be on a plane, train, boat, balloon or other moving object.

In some examples, the data processing device determines the path of a communication based on a scoring function of one or more of a distance between the source and the destination, a capacity of an inter-device link between two devices, an operational status of a communication device, and a signal strength of a communication device. The operational status of a communication device may include an active status or an inactive status of the communication device. The device status may reflect the status of the entire communication device or one or more individual components of the communication device, such as the state of charge of batteries and a power output of its power source.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
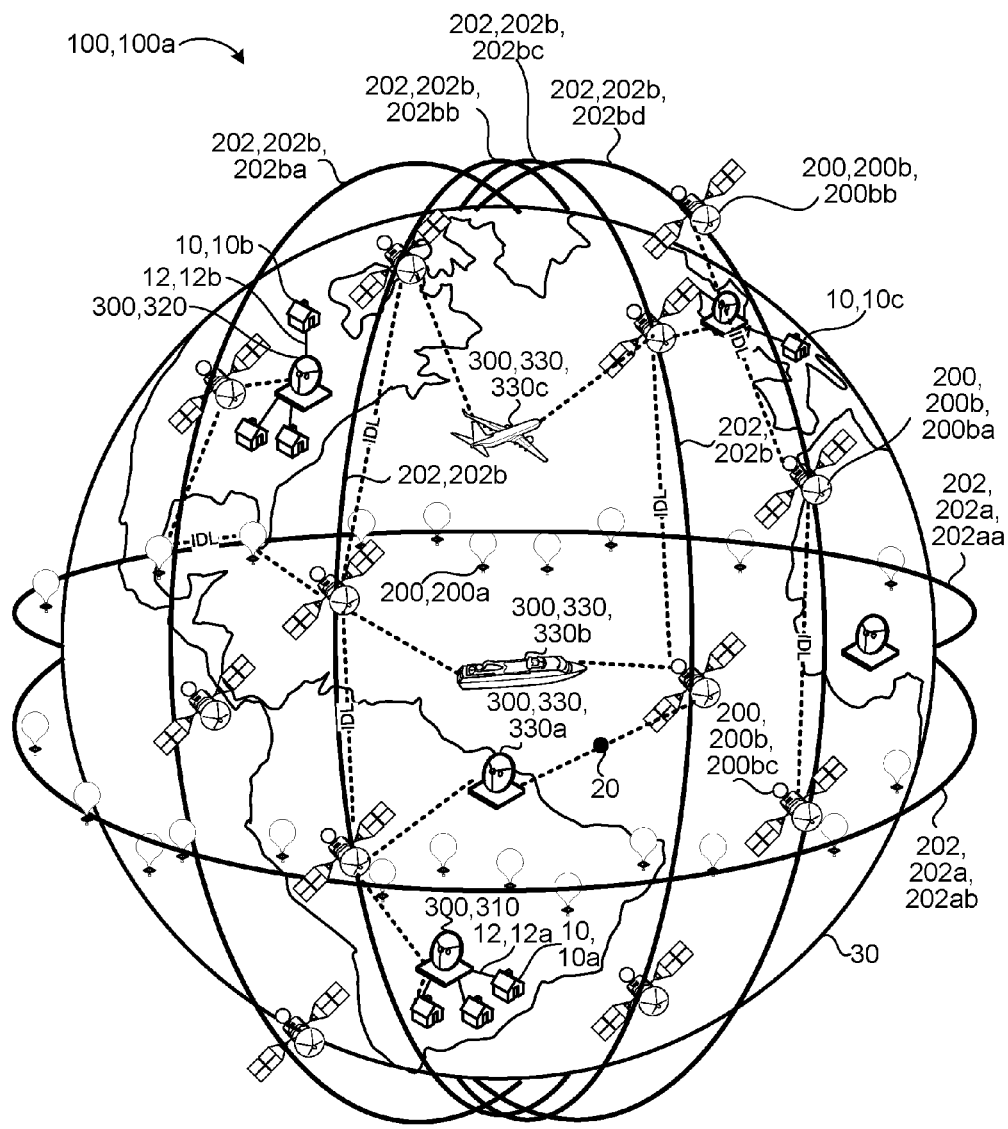
FIG. 1A is schematic view of an exemplary global-scale communication system with satellites and communication balloons, where the satellites form a polar constellation.
Figure 1B:
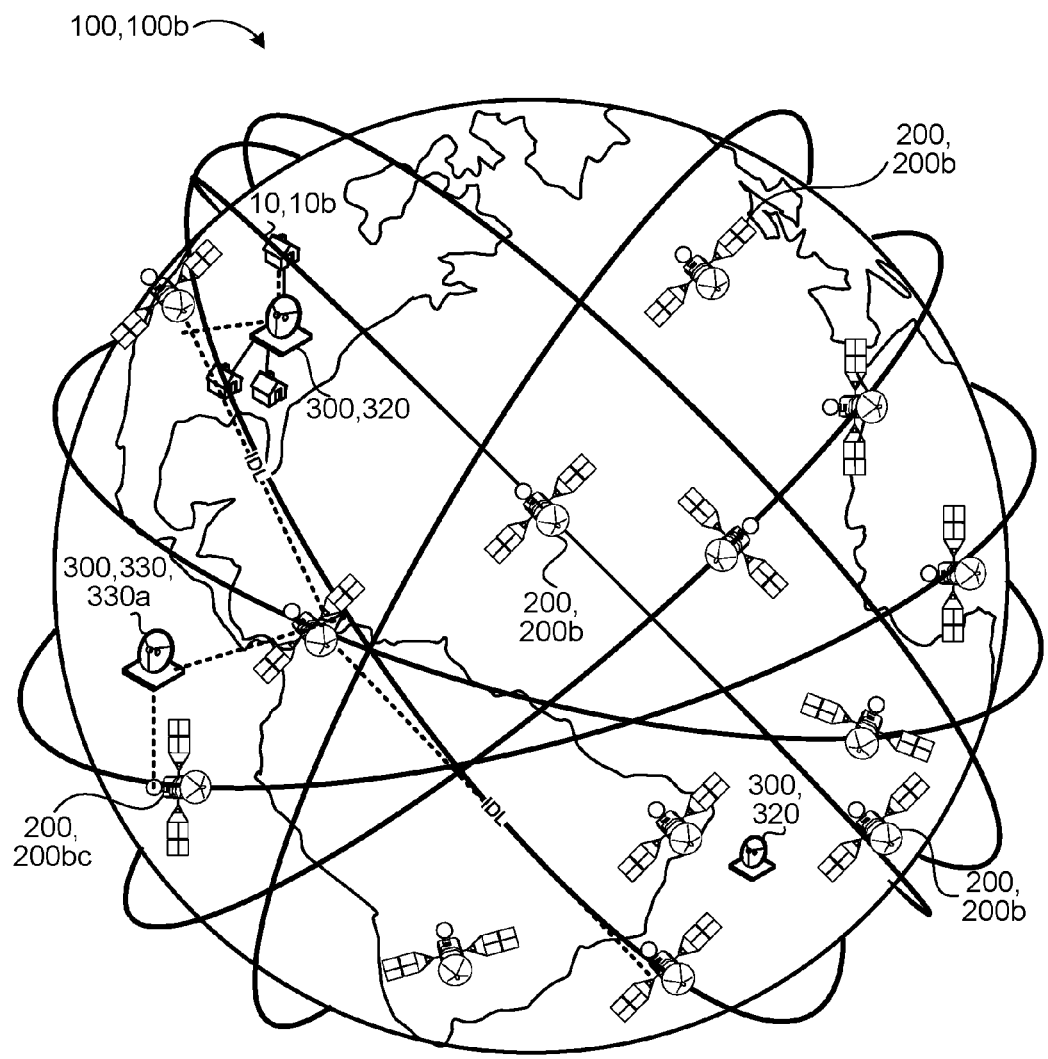
FIG. 1B is schematic view of an exemplary group of satellites of FIG. 1A forming a Walker constellation.

Referring to FIGS. 1A-1E, in some implementations, a global-scale communication system 100 includes High Altitude Communication Devices (HACD) 200, gateways 300 (including source ground stations 310, destination ground stations 320, and linking-gateways 330), and a system data processing device 110. In some examples, the source ground stations 310 and/or the destination ground stations 320 are user terminal or gateways 300 connected to one or more user terminals. An HACD 200 is a device released into the earth's atmosphere. HACD 200 may refer to a communication balloon 200a or a satellite 200b in Low Earth Orbit (LEO) or Medium Earth Orbit (MEO) or High Earth Orbit (HEO), including Geosynchronous Earth Orbit (GEO). The HACD 200 includes an antenna 207 that receives a communication 20 from a source ground station 310 and reroutes the communication signal to a destination ground station 320. The HACD 200 also includes a data processing device 110 that processes the received communication 20 and determines a path of the communication 20 to arrive at the destination ground station 320. The global-scale communication system 100 may include communication balloons 200a, satellites 200b, or a combination of both as shown in FIG. 1A. Additionally, the global-scale communication system 100 includes multiple ground stations 300, such as a source ground station 310, a destination ground station 320, and a linking-gateway 330. The source ground station 310 is in communication with a first user 10a through a cabled, a fiber optic, or a wireless radio-frequency connection 12a, and the destination ground station 320 is in communication with the second user 10b through a cabled, a fiber optic, or a wireless radio-frequency connection 12b. In some examples, the communication between the source ground station 310 and the first user 10a or the communication between the destination ground station 320 and the second user 10b is a wireless communication (either radio-frequency or free-space optical).

The HACDs 200 are divided into groups 202, with each group 202 (also referred to as a plane, since their orbit or trajectory may approximately form a geometric plane) having an orbital path or trajectory different than other groups 202. For example, the balloons 200a as the HACDs 200 rotate approximately along a latitude of the earth 30 (or in a trajectory determined in part by prevailing winds) in a first group or plane 202aa and along a different latitude or trajectory in a second group or plane 202ab. Similarly, the satellites 200b may be divided into a first group or plane 202ba and a second group or plane 202bb. The satellites 200b may be divided into a larger or smaller number of groups 202b. The data processing device 110 may be any one of the data processing devices 210 of the HACDs 200, the data processing device 110 of any of the gateways 300, another data processing device in communication with the HACDs 200 and gateways, or a combination thereof.

The first user 10a may communicate with the second user in 10b or a third user 10c. Since each user 10 is in a different location separated by an ocean or large distances, a communication 20 is transmitted from the first user 10a through the global-scale communication system 100 to reach its final destination, i.e., the second or third users 10b, 10c. Therefore, it is desirable to have a global-scale communication system 100 capable of routing communication signal traffic over long distances, where one location is in a location far from a source or destination ground station 310, 320 (e.g., ocean). In addition, it is desirable to provide reduced latency of the system 100 and enhanced security due to the use of the HACDs 200, as compared to fiber or cable-based communications. Moreover, it is desirable to have a cost effective system. As will later be discussed a global-scale communication system 100 capable of being readily connected and provide connectivity of HACDs 200 with fewer and simpler inter-satellite links per HACD 200 is also desirable.

Communication security can be a major concern when building a communication network that allows different users 10 to communicate over long distances and especially continents. A communication signal being transmitted via a cable may be intercepted and the information being communicated may be retrieved. In some examples, fiber optics cables can be tapped for interception of communications using special tapping equipment. Interception of an optical fiber allows for the retrieval of all voice and data communications transmitted through the fiber cable, which in most instances may not be detected. The fiber may also be deliberately or accidentally cut or damaged, interrupting communications. Therefore, to avoid or minimize data interception or interruption, the global-scale communication system 100 limits or in some cases eliminates the use of fiber cables, providing a more secure signal trafficking. For example, the use of fiber optic cables is limited to relatively short distances from the source and destination ground stations 310, 320 to the user 10.

Communication balloons 200a are balloons filled with helium or hydrogen and are released in to the earth's stratosphere to attain an altitude between 11 to 23 miles, and provide connectivity for a ground area of 25 miles in diameter at speeds comparable to terrestrial wireless data services (such as 3G or 4G). The communication balloons 200a float in the stratosphere, at an altitude twice as high as airplanes and the weather (e.g., 20 km above the earth's surface). The high-altitude balloons 200a are carried around the earth 30 by winds and can be steered by rising or descending to an altitude with winds moving in the desired direction. Winds in the stratosphere are usually steady and move slowly at about 5 and 20 mph, and each layer of wind varies in direction and magnitude.

Figure 1D:
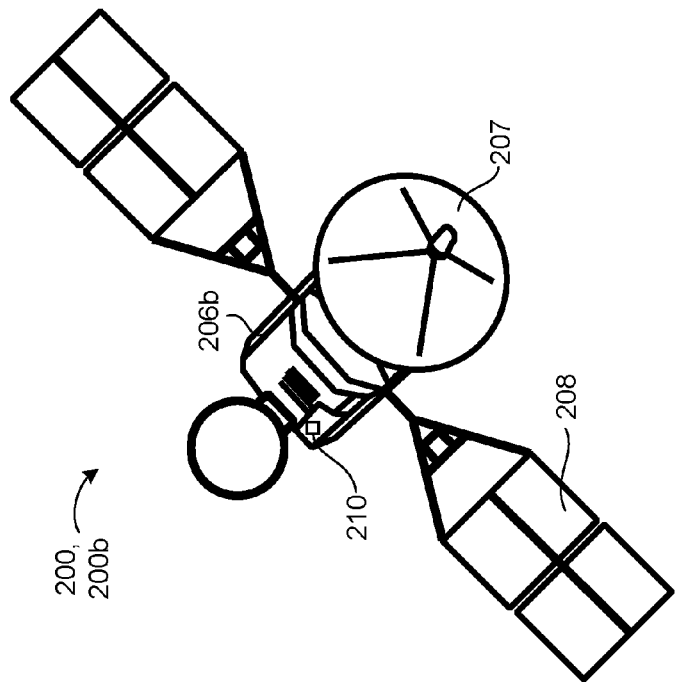
FIG. 1D is a perspective view of an exemplary satellite of the global-scale communication system.
Figure 1C:
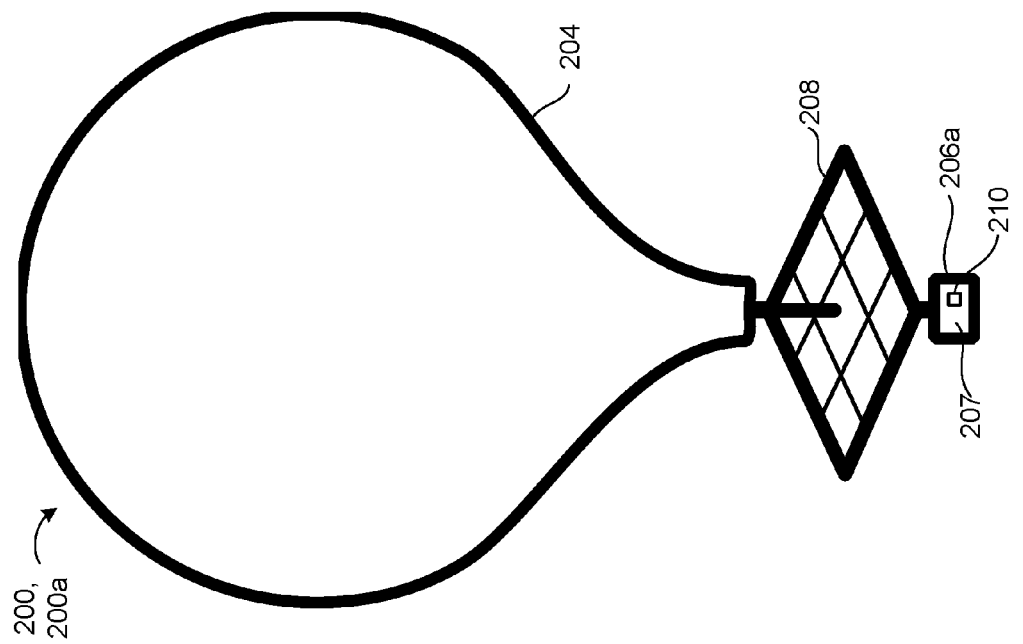
FIG. 1C is a perspective view of an exemplary communication balloon of the global-scale communication system.
Figure 1E:
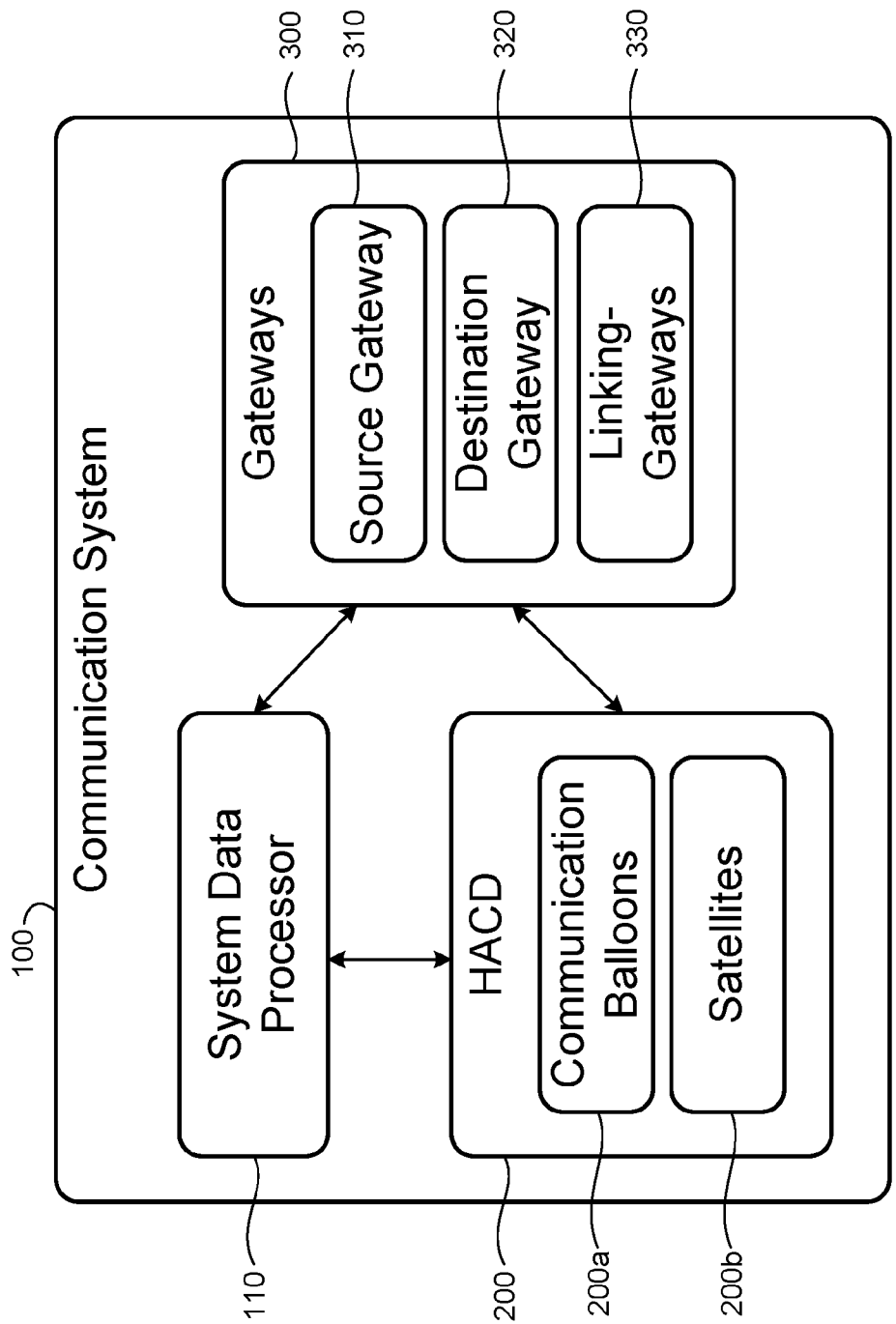
FIG. 1E is a schematic view of an exemplary global-scale communication system.

Referring to FIG. 1C, the communication balloons 200a include a balloon 204 (e.g., sized about 49 feet in width and 39 feet in height), an equipment box 206a, and solar panels 208. The equipment box 206a includes a data processing device 210 that executes algorithms to determine where the high-altitude balloon 200a needs to go, then each high-altitude balloon 200a moves into a layer of wind blowing in a direction that will take it where it should be going. The equipment box 206a also includes batteries to store power and a transceiver (e.g., antennas 207) to communicate with other balloons 200a, internet antennas on the ground or gateways 300. The communication balloons 200a also include solar panels 208 that power the equipment box 206a. In some examples, the solar panels 208 produce about 100 watts in full sun, which is enough to keep the communication balloons 200a running while charging the battery and is used during the night when there is no sunlight. When all the high-altitude balloons 200a are working together, they form a balloon constellation. In some implementations, users 10 on the ground have specialized antennas that send communication signals to the communication balloon 200a eliminating the need to have a source or destination ground station 310, 320. The communication balloon 200a receiving the communication 20 sends the communication 20 to another communication balloon 200a until one of the communication balloons 200a is within reach of a destination ground station 320 that connects to the local internet provider and provides service to the user 10 via the network of balloons 200a.

A satellite 200b is an object placed into orbit around the earth 30 and may serve different purposes, such as military or civilian observation satellites, communication satellites, navigations satellites, weather satellites, and research satellites. The orbit of the satellite 200b varies depending in part on the purpose the satellite 200b is being used for. Satellite orbits may be classified based on their altitude from the surface of the earth 30 as Low Earth Orbit (LEO), Medium Earth Orbit (MEO), and High Earth Orbit (HEO). LEO is a geocentric orbit (i.e., orbiting around the earth 30) that ranges in altitude from 0 to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit.

Multiple satellites 200b working in concert form a satellite constellation. The satellites 200b within the satellite constellation may be coordinated to operate together and overlap in ground coverage. Two common types of constellations are the polar constellation (FIG. 1A) and the Walker constellation (FIG. 1B), both designed to provide maximum earth coverage while using a minimum number of satellites 200b. The system 100a of FIG. 1A includes the satellites 200b arranged in a polar constellation that covers the entire earth 30 and orbits the poles, while the system 100b of FIG. 1B includes satellites 200b arranged in a Walker constellation that covers areas below certain latitudes, which provides a larger number of satellites 200b simultaneously in view of a user 10 on the ground (leading to higher availability, fewer dropped connections).

Referring to FIG. 1D, a satellite 200b includes a satellite body 206b having a data processing device 210, similar to the data processing device 210 of the communication balloons 200a. The data processing device 210 executes algorithms to determine where the satellite 200b is heading. The satellite 200b also includes an antenna 207 for receiving and transmitting a communication 20. The satellite 200b includes solar panels 208 mounted on the satellite body 206b. The solar panels 208 provide power to the satellite 200b. In some examples, the satellite 200b includes rechargeable batteries used when sunlight is not reaching and charging the solar panels 208.

When constructing a global-scale communications system 100 from multiple HACDs 200, it is sometimes desirable to route traffic over long distances through the system 100 by linking one HACD 200 to another. For example, two satellites 200b may communicate via inter-satellite links and two balloons 200a may communicate via inter-balloon links. Such inter-device (satellite 200b or balloon 200a) linking IDL is useful to provide communication services to areas far from source and destination ground stations 310, 320 and may also reduce latency and enhance security (fiber optic cables 12 may be intercepted and data going through the cable may be retrieved). This type of inter-device communication is different than the "bent-pipe" model, in which all the signal traffic goes from a ground-base gateway 310, 320 to a satellite 200b, and then directly down to a user 10 on earth 30 or vice versa. The "bent-pipe" model does not include any inter-device communications; instead, the satellite 200b acts as a repeater. In some examples of "bent-pipe" models, the signal received by the satellite 200b is amplified before it is re-transmitted; however, no signal processing occurs. In other examples of the "bent-pipe" model, part or all of the signal may be processed and decoded to allow for one or more of routing to different beams, error correction, or quality-of-service control; however no inter-device communication occurs.

In some implementations, long-scale HACD constellations (e.g., balloon constellation or satellite constellations) are described in terms of a number of planes or groups 202, and the number of HACDs 200 per plane 202. HACDs 200 within the same plane 202 maintain the same position relative to their intra-plane HACD 200 neighbors. However, the position of an HACD 200 relative to neighbors in an adjacent plane 202 varies over time. For example, in a large-scale satellite constellation with near-polar orbits, satellites 200b within the same plane (which corresponds roughly to a specific latitude, at a given point in time) 202ba (FIG. 1A) maintain a roughly constant position relative to their intra-plane neighbors (i.e., a forward and a rearward satellite 200b), but their position relative to neighbors in an adjacent plane 202bb, 202bc, 202bd varies over time. A similar concept applies to the communication balloons 200a; however, the communication balloons 200a rotate the earth 30 about its latitudinal plane and maintain roughly a constant position to its neighboring communication balloons 200a (see the balloon planes 202aa, 202ab in FIG. 1A).

Inter-device link (IDL) eliminates or reduces the number of HACDs 200 to gateway hops, which decreases the latency and increases the overall network capabilities. Inter-device links allow for communication traffic from one HACD 200 covering a particular region to be seamlessly handed over to another HACD 200 covering the same region, where a first HACD 200 is leaving the first area and a second HACD 200 is entering the area.

In some implementations, an HACD constellation includes HACDs 200 having enough inter-device links to make the constellation fully-connected, where each HACD 200 is equipped with communication equipment and additional antennas 207 to track the location of other HACDs 200 in the same plane 202 or in other adjacent planes 202 in order to communicate with the other satellites 200b. This increases the cost of the HACD 200, since it adds additional hardware (e.g., the additional antennas) and computations for the HACD 200 to track HACDs 200 in other planes 202 whose position is constantly changing. Therefore, to maintain the simplicity and low cost of design, construction, and launch of the system 100, the system 100 includes an HACD 200 that only tracks a first HACD 200 in front or forward of it and another HACD 200 behind it or rearward of it. Referring back to FIG. 1A, consider polar plane 202bd having three visible satellites 200ba, 200bb, 200bc. The current satellite 200ba is in communication with a forward satellite 200bb and a rearward satellite 200bc via inter-device linking. The current satellite 200ba is not capable of directly communicating with other satellites 200b in another plane 202, or other satellites 200b not being the forward satellite 200bb or the rearward satellite 200bc. To achieve a fully-connected system 100, the system 100 includes linking-gateways 330 that receive a communication 20 from an HACD 200 and send the communication 20 to another HACD 200 in a different plane 202. As shown in FIG. 1A, a linking-gateway 330a, 330b, 330c connects two HACDs 200 each being in a different group or plane 202bb, 202bc. This means that the linking-gateway 330 is in communication with at least a first group of HACDs 200 orbiting in a first plane 202aa, 202ba, and a second group of HACDs 200 orbiting in a second plane 202ab, 202bb, different than the first plane 202aa, 202ba; the linking-gateway 330 receives the communication 20 from the first group 202aa, 202ba of HACDs 200 and sends the communication 20 to the second group 202ab, 202bb of HACDs 200. The first group orbiting the first plane 202aa, 202ba receives the communication 20 from a source ground station 310 and the second group orbiting the second plane 202ab, 202bb sends the communication to a destination ground station 320. This set-up provides a fully-connected HACD constellation at a lower price and less complexity than the current satellites 200b that have complex algorithms to track multiple other HACDs 200, which means a signal from one HACD 200 can be sent to any other HACD 200 within the constellation. For example, within a plane 202, each HACD 200 can link with a forward HACD 200 located in front of the current HACD 200, and a backward HACD 200 located rearward the current HACD 200. This reduces the number of links of each HACD 200 to other HACDs 200, thus reducing the cost of additional equipment needed for tracking more than one HACD 200.

A ground station 300 is usually used as a connector between HACDs 200 and the internet, or between HACDs 200 and user terminals 10. However, the system 100 utilizes the gateways 300 as linking-gateways 330 for relaying a communication 20 from one HACD 200 to another HACD 200 where each HACD is in a different plane 202. Each linking-gateway 330 receives a communication 20 from an orbiting HACD 200, processes the communication 20 and switches the communication 20 to another HACD 200 in a different plane 202. Therefore, the combination of the HACD 200 and the linking-gateways 330 provide a fully-connected system 100 when using the linking-gateways 330 to fill the gap reducing the number of antennas of each HACD 200, which track other HACD 200 devices that are within another plane 202 of the current HACD 200.

For simplification purposes, consider a system 100 having two in-plane IDLs and no IDLs to other planes 202. In other words, each HACD 200 sees another HACD 200 immediately in front of it and another one immediately behind it. The system 100 looks like a series of rings, each being a plane 202, where each ring is isolated from other rings (planes 202). Communication signals 20 may be passed from one plane 202 to another, i.e., the rings may be connected, by sending the communication signal 20 from one ring to a linking-gateway 330, which in turn sends it to another ring. The linking-gateway 330 receives the communication 20 and links it to another HACD 200 in another ring without allowing the communication 20 to be transferred through terrestrial networks (e.g., fiber cables), which provides security benefits.

Figure 2A:
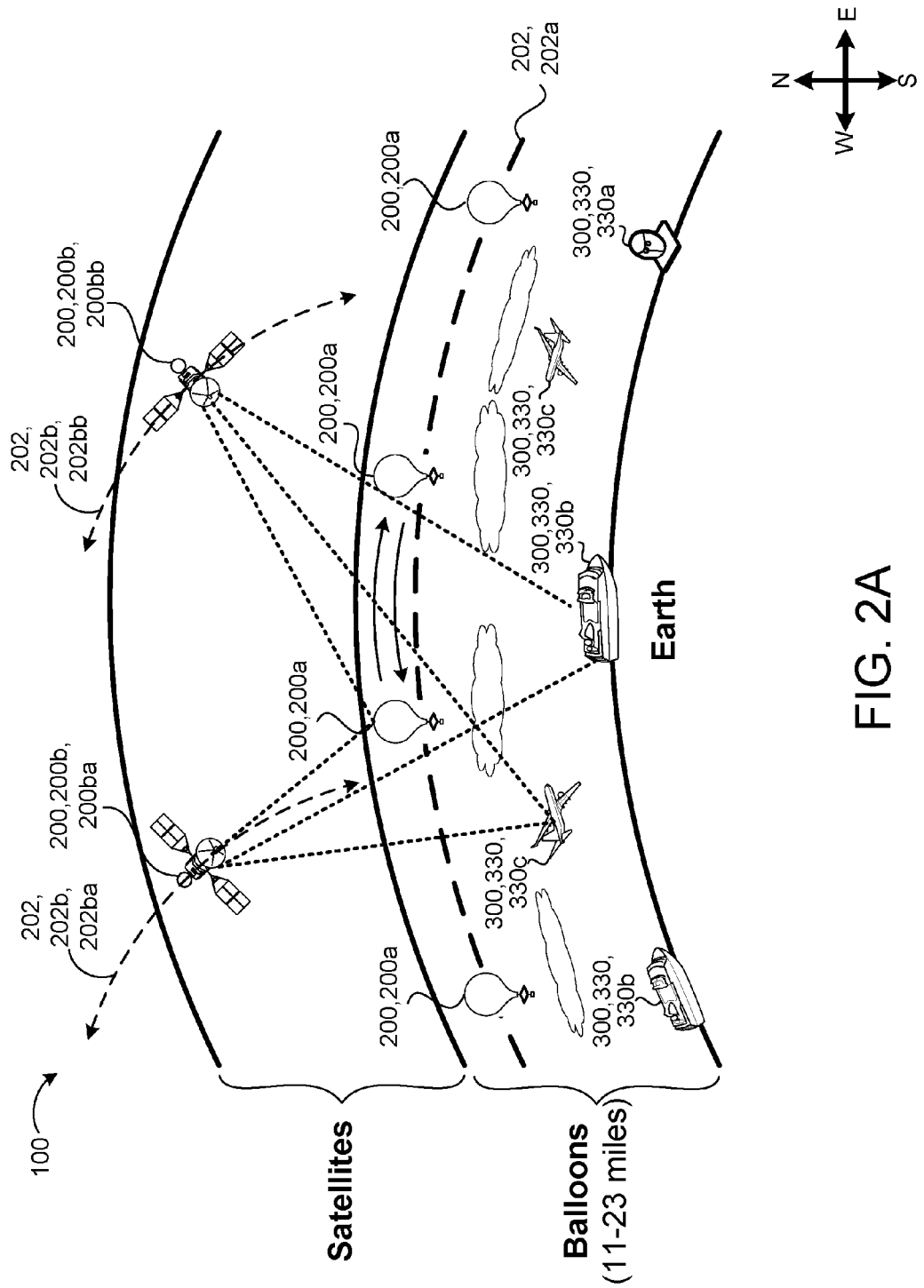
FIGS. 2A and 2B are schematic views of two exemplary satellites in two different groups communicating using a linking-gateway.
Figure 2B:
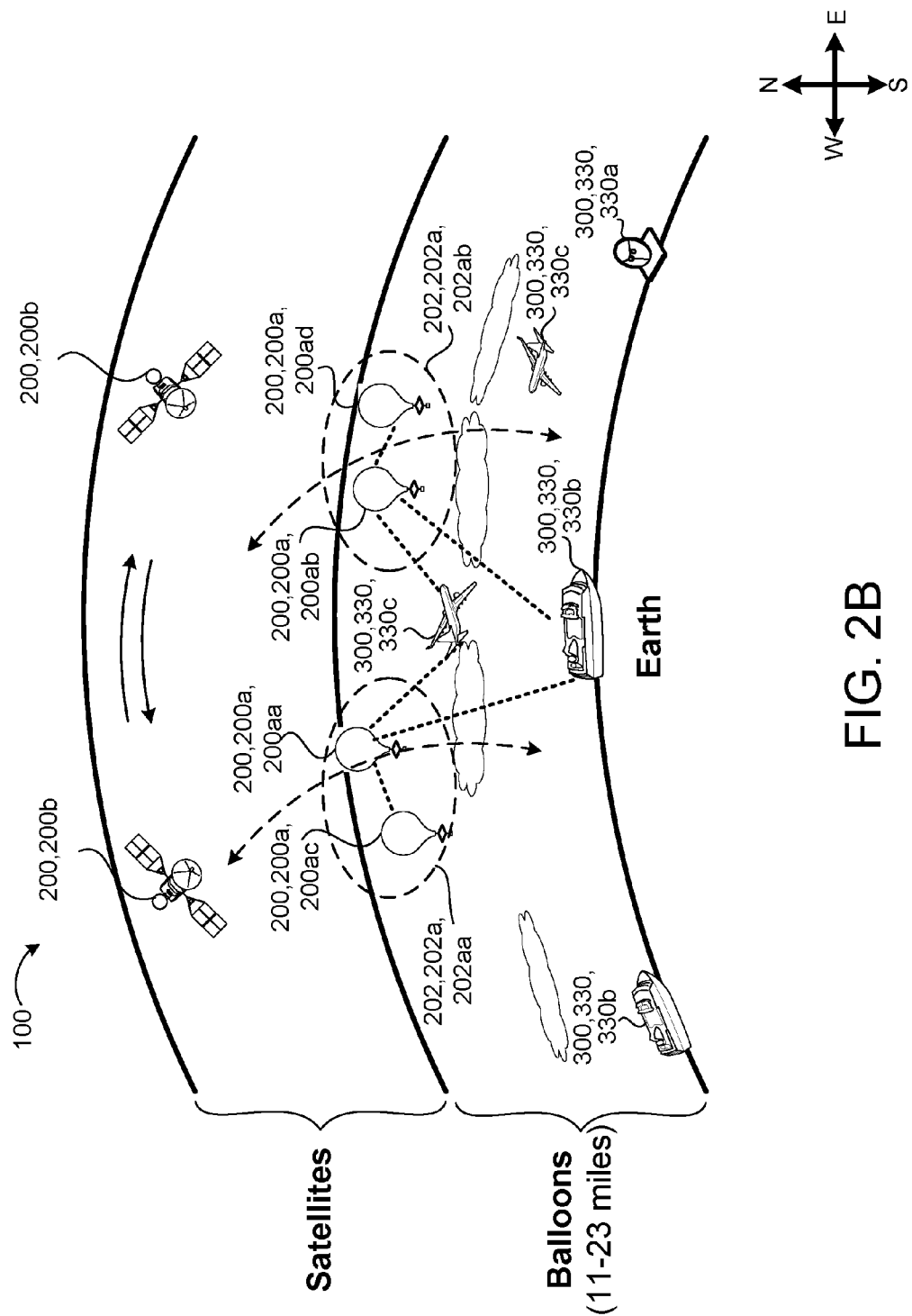

Referring to FIGS. 2A and 2B, the linking-gateways 330 may be a stationary linking-gateway 330a or a moving linking-gateway 330b, 330c (e.g., positioned on a moving object, such as an airplane, train, boat, or any other moving object). Referring to FIG. 2A, in some examples, in a constellation of satellites 200b, the balloons 200a act as a linking-gateway 330a. As shown, a first satellite 200ba in a first plane 202ba and a second satellite 200bb in a second plane 202bb are able send a communication 20 between one another, without the additional antennas and hardware required, by utilizing the linking-gateways 330 to relay or retransmit the signal from the first satellite 200ba to the second satellite 200bb. The linking-gateway 330 is (or on) any one of a balloon 200a, an airplane 330c, a boat 330b, or a stationary device 330a on non-moving land. Also as shown, the linking-gateways 330 are moving objects. Referring to FIG. 2B, in some examples, the constellation of balloons 200a uses the linking-gateways 330 to link a first balloon 200aa in a first plane 202aa with a second balloon 200ab in a second plane 202ab using a linking-gateway 330. In some examples, the satellites 200b act as linking-gateways 330.

In some implementations, where an HACD constellation follows a polar or near-polar orbit, a linking-gateway 330 is located near one or both of the poles. This is particularly useful because one linking-gateway 330 can "see" or in other words communicate with HACDs 200 in most or all planes 202, thus enabling communication signals to pass from any plane 202 to any other plane 202 with a single linking-gateway bounce.

Figure 3A:
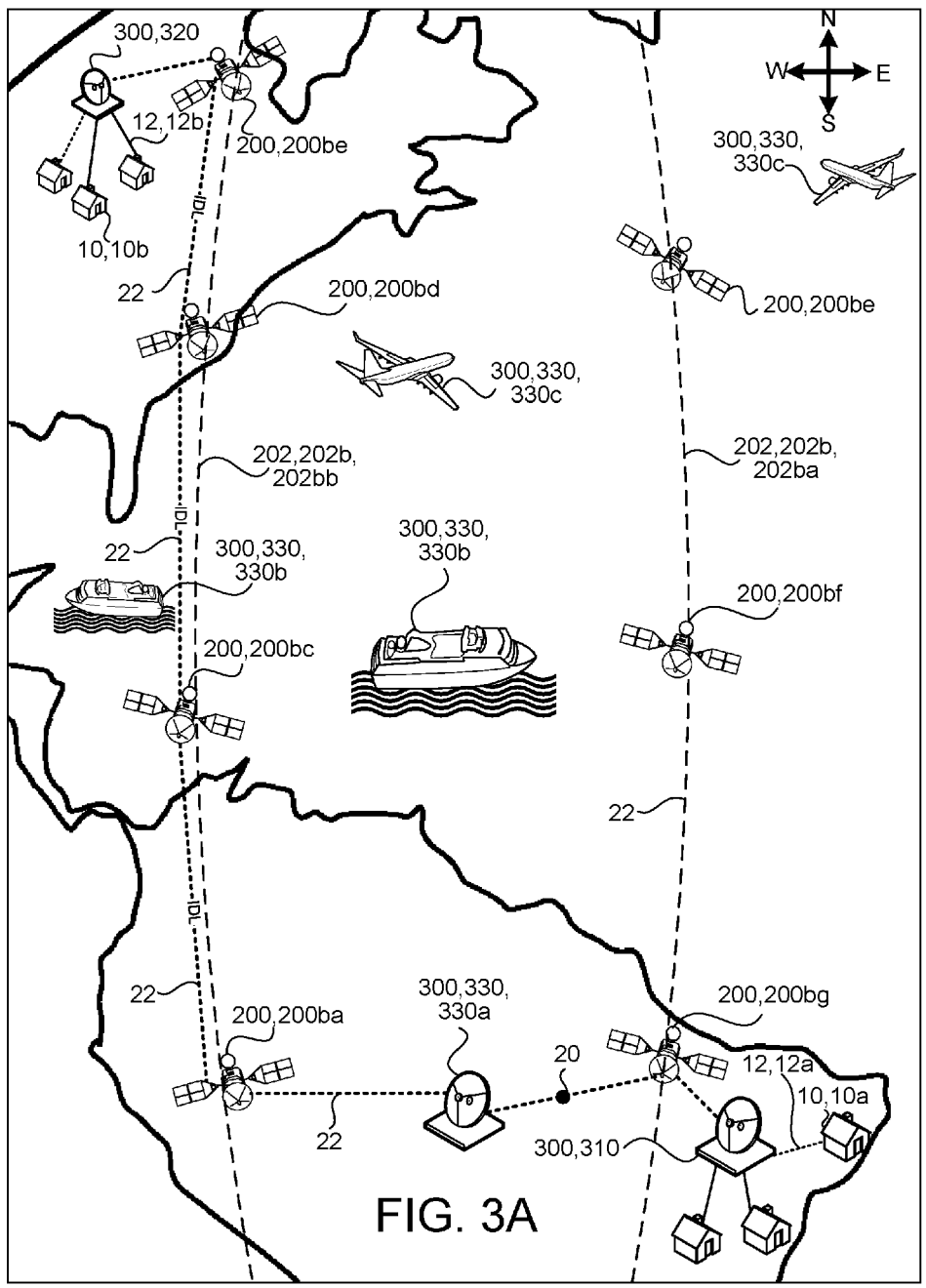
FIGS. 3A-3C are schematic views of an exemplary path between satellites and a linking-gateway for sending a communication between a first user and a second user in a global-scale communication system.
Figure 3B:
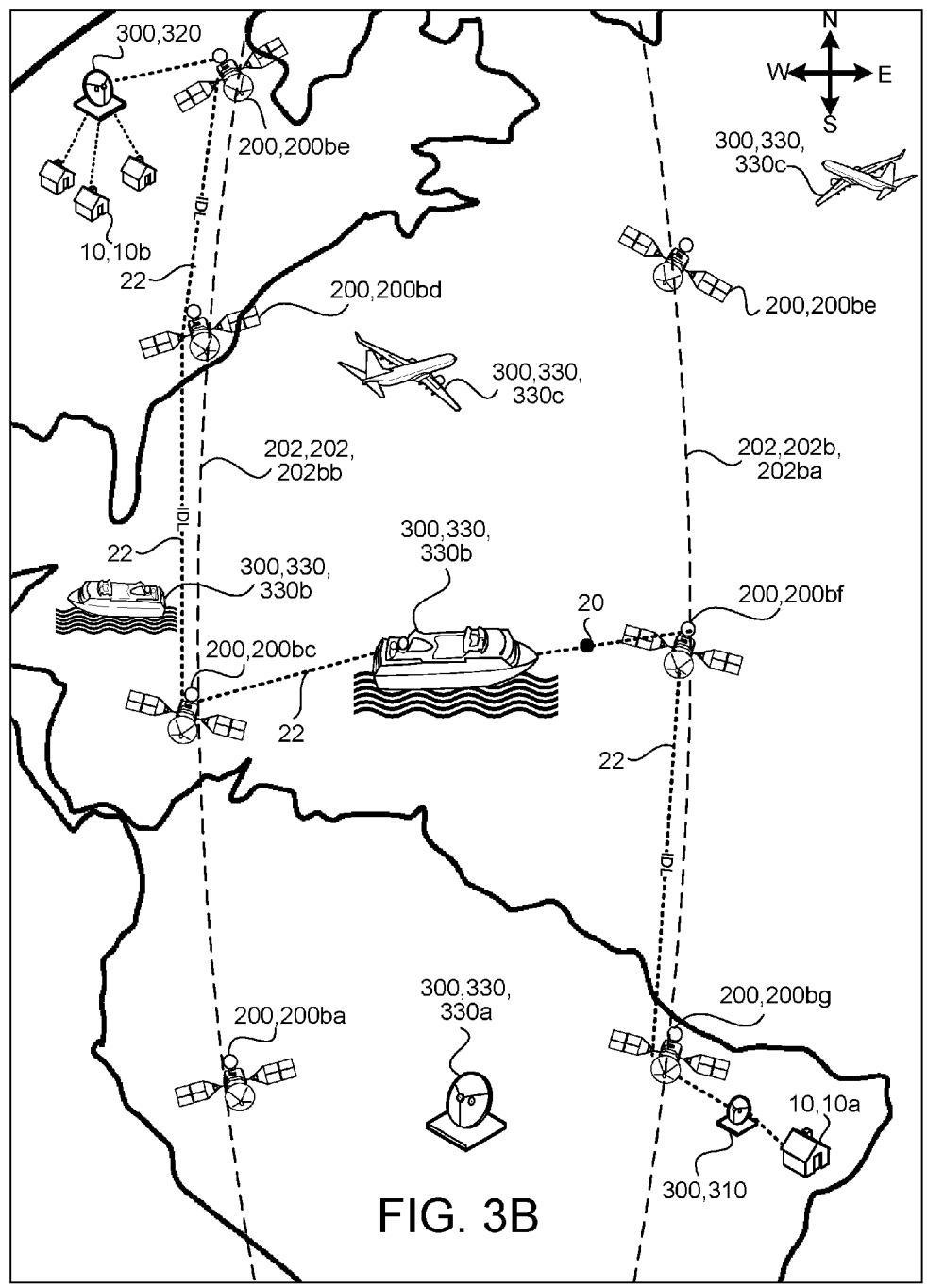
Figure 3C:
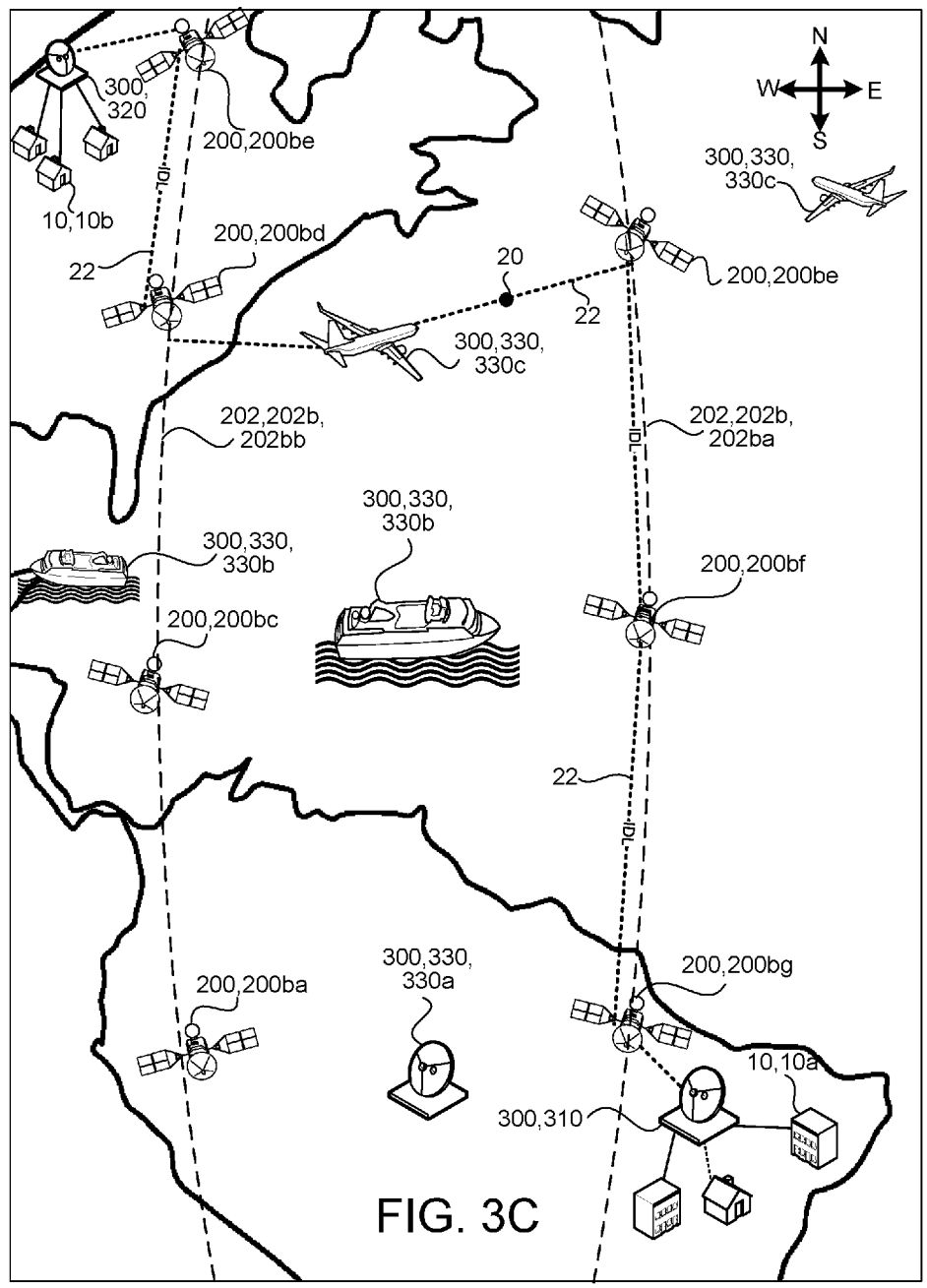

FIGS. 3A-3C provide examples of communication paths 22 from a first user 10a to a second user 10b. In some examples, a first user 10a in Brazil wants to communicate with a second user 10b in the U.S.A. The first user 10a sends a communication 20 to the second user 10b. The global-scale communication system 100 receives the communication 20 at a source ground station 310 and determines (using the system data processor 110) a path 22 leading to the destination ground station 320. In some examples, the source ground station 310 receives the communication 20 from the first user 10a through a cabled or fiber optic connection 12. In other examples, the source ground station 310 receives the communication 20 through a wireless radio-frequency communication. Similarly, the destination ground station 320 may transmit the communication 20 to the second user 10b through cables or fiber optic connection 12, or through a wireless radio-frequency communication. Other examples are possible as well, such as free-space optical communications or combinations of free-space optical, cabled, wireless radio-frequency, and fiber optic communications between users 10 and gateways 300 (e.g., source and destination ground stations 310, 320). Moreover, a user 10 may be in a house, a residential building, a commercial building, a data center, a computing facility, or a service provider. In some examples, the source ground station 310 and/or the destination ground station 320 connects to one or more users 10. Moreover, a user 10 may be a source ground station 310 or a destination ground station 320.

When the system 100 receives the communication 20, the system data processing device 210 determines the path 22 of the communication 20 based on one or more criterions. In some implementations, the system data processing device 110 considers, but is not limited to, border gateway protocol (which includes routing algorithms), interior gateway protocol, maximum flow problem, and/or shortest path problem.

The border gateway protocol (BGP) is an exterior gateway protocol used to exchange routing and reachability information between autonomous systems on the internet. The protocol is classified as either a path vector protocol or a distance vector routing protocol. The path routing protocol is a computer routing protocol for maintaining the path information (of a communication 20) that gets updated dynamically. The path routing protocol is different from the distance vector routing protocol in that each entry in its routing table includes a destination network (e.g., destination ground station 320 or end user 10b), the next router (e.g., the next HACD 200), and the path 22 to reach the destination ground station 320. The distance vector routing protocol requires that a router (e.g., HACD 200 or linking-gateway 330) informs its neighbors (e.g., HACD 200 or linking-gateway 330) of topology changes periodically. When the system 100 uses the distance vector routing protocol, the system 100 considers the direction in which each communication 20 should be forwarded, and the distance from its destination (current position). The system data processing device 110 calculates the direction and the distance to any other HACD 200 in the system 100. Direction is the measure of the cost to reach the next destination; therefore, the shortest distance between two nodes (e.g., HACDs 200, gateways 300) is the minimum distance. The routing table of the distance vector protocol of a current device (e.g., HACD 200 or gateway 300) is periodically updated and may be sent to neighboring devices. BGP does not utilize Interior Gateway Protocol (IGP).

Interior gateway protocol (IGP) may be used for exchanging routing information between gateways (e.g., HACDs 200 or linking-gateways 330) within an autonomous system (e.g., the system 100). This routing information can then be used to route network-level protocols like Internet Protocol (IP). By contrast, exterior gateway protocols are used to exchange routing information between autonomous systems and rely on IGPs to resolve routes within an autonomous system. IGP can be divided into two categories: distance-vector routing protocols and link-state routing protocols. Specific examples of IGP protocols include Open Shortest Path First (OSPF), Routing Information Protocol (RIP) and Intermediate System to Intermediate System (IS-IS).

The maximum flow problem and associated algorithm includes finding a feasible flow from a single source to a single destination through a network that is maximal, where the source and the destination are separated by other devices (e.g. HACDs 200, gateways 300). The maximum flow problem considers the upper bound capacity between the HACDs 200 or gateways 300 to determine the maximum flow. The shortest path problem includes finding a shortest path 22 between the HACDs or gateways 300, where the shortest path 22 includes the smallest cost. Shortest path may be defined in terms of physical distance, or in terms of some other quantity or composite score or weight, which is desirable to minimize. Other algorithms may also be used to determine the path 22 of a communication 20.

The algorithms used to determine the path 22 of a communication 20 may include a scoring function for assigning a score or weight value to each link (communication between the HACDs 200 or between the HACDs 200 and the gateways 300). These scores are considered in the algorithms used. For example, the algorithm may try to minimize the cumulative weight of the path 22 (i.e., sum of the weights of all the links that make up the path 22). In some implementations, the system data processor 110 considers the physical distance (and, closely related, latency) between the HACD 200 or gateway 300, the current link load compared to the capacity of the link between the HACD 200 or gateway 300, the health of the HACD 200 or gateway 300, or its operational status (active or inactive, where active indicates that the device is operational and healthy and inactive where the device is not operational); the battery of the HACD 200 or gateway 300 (e.g., how long will the device have power); and the signal strength at the user terminal (for user terminal-to-satellite link).

Referring back to FIG. 3A, the system data processing device 110 may determine the path 22 of the communication 30 as shown. For example, the source ground station 310 receives the communication 20 and sends it to the nearest satellite 200bg, which in turn sends it to a linking-gateway 300a (ground gateway). The linking-gateway 330a in-turn sends the communication 20 to another satellite 200ba being in a different plane 202 than the first receiving satellite 200bg. The second satellite 200ba sends the communication 20 to a forwards or rearward satellite 200*bc* (depending on the orbital path of the satellites 200*b*) via inter-device links, which in turn sends the communication 20 to another satellite 200*bd* via inter-device links, and lastly to a final satellite 200*be* via inter-device links. The final satellite 200*be* sends the communication 20 to its destination ground station 320, which sends the communication 20 to the end user 10*b*. As described, the communication 20 hoped planes 202 by using the linking-gateway 330.

Another example of a path 22 between a source ground station 310 and a destination ground station 320 is shown in FIG. 3B. In this case, the communication 20 travels from the source ground station 310 to a first satellite 200*bg*, then from the first satellite 200*bg* to a second satellite 200*bf* via inter-device links. The second satellite 200*bf* sends the communication to a linking-gateway 330, in this case a moving gateway 300*b* (e.g., a boat 330*b*), which in turns links the communication 20 between the satellites 200*bf*, 200*bc* in two planes 202*ba*, 202*bb*. The satellites 200*bc*, 200*bd*, 200*be* within the second plane 202*bb* communicate via inter-device links to transfer the communication 20 to its destination ground station 320.

A third example of a path 22 between a source ground station 310 and a destination ground station 320 is shown in FIG. 3C. In this case, the communication 20 travels from the source ground station 310 to a first satellite 200*bg* in a first plane 202*ba*, then from the first satellite 200*bg*, to a second satellite 200*bf* to a third satellite 200*be* where the communication between the two satellites 200*b* is via inter-device links. The third satellite 200*be* sends the communication 20 to a linking-gateway 330*c* being a moving gateway (e.g., an airplane 300*c*), which links the communication 20 to the satellite 200*b* in the second plane 202*bb*.

As described in FIGS. 3A-3C, the communication 20 travels from a first user 10*a* to a second user 10 via one linking-gateway 330 from a first group (e.g., plane 202) of satellites 200*b* to a second group (e.g., plane 202) of satellites 200*b*. However, in some implementations, the communication 20 travels through more than one linking-gateway 330, e.g., a second linking-gateway 330, to a third group (e.g., plane 202) of satellites 200*b*. This could be repeated as many times as necessary (i.e., multiple linking-gateways 330 linking satellites 200*b* located in different planes 202) to reach a final group of satellites 200*b*, which in turn sends the communication 20 to the destination ground station 320.

Figure 4A:
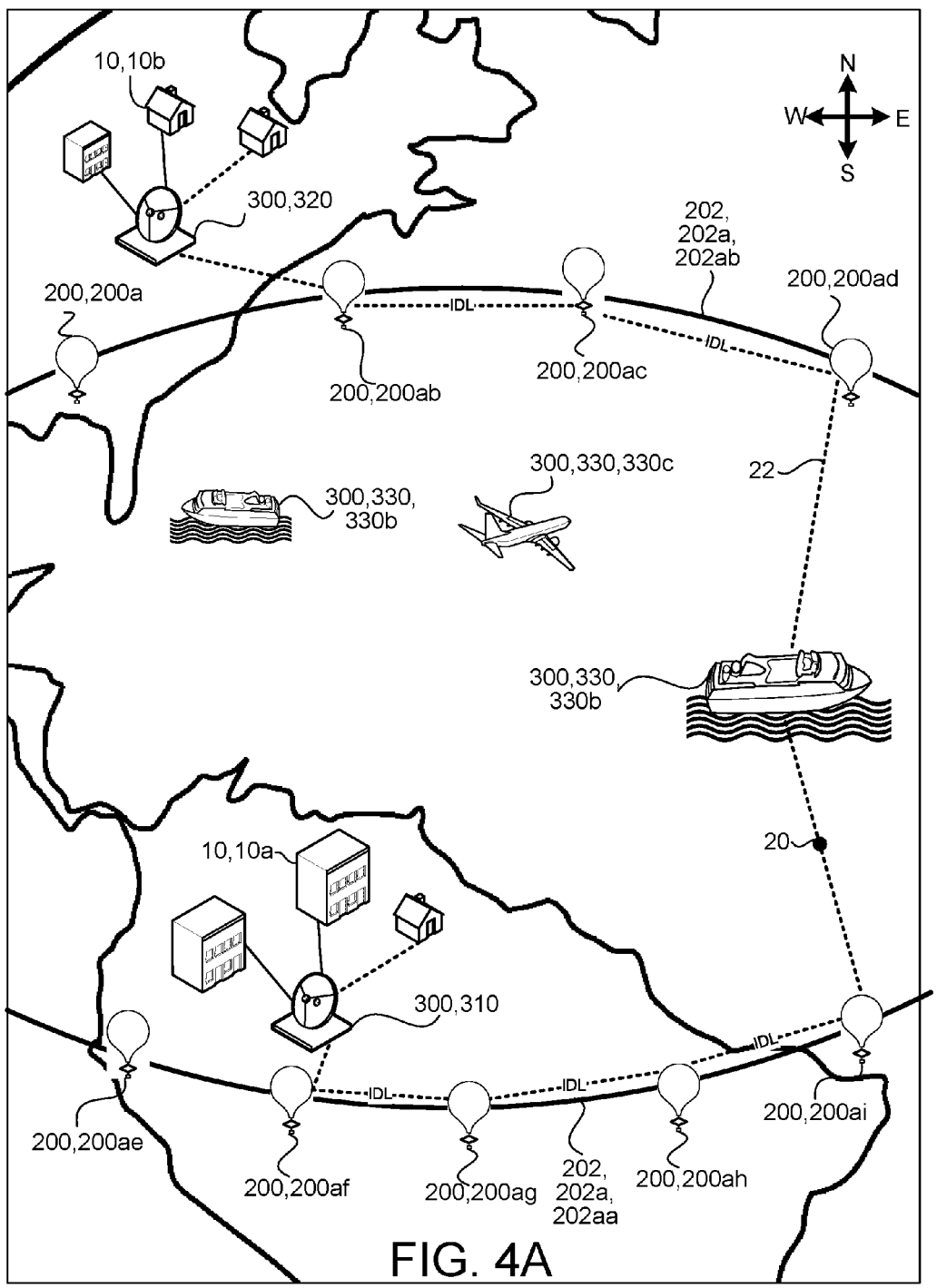
FIGS. 4A and 4B are schematic views of an exemplary path between balloons and a linking-gateway for sending a communication between a first user and a second user in a global-scale communication system.
Figure 4B:
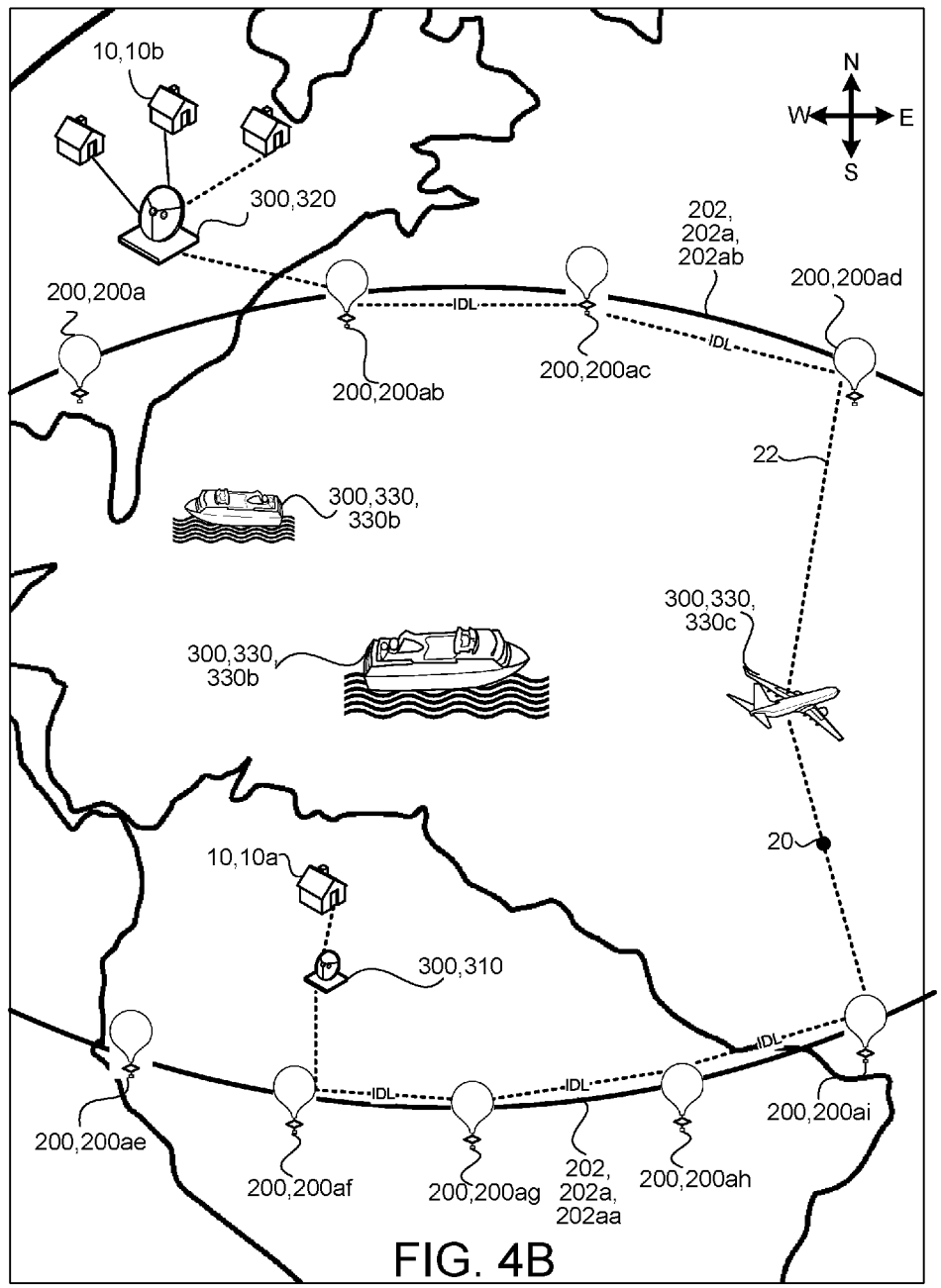

Similar to the examples of FIGS. 3A-3B where the HACD 200 is a satellite 200*b*, FIGS. 4A and 4B show a constellation of balloons 200*a* where the system data processor 110 determines a path 22 of the communication 20 amongst the communication balloons 200*a* from a first user 10*a* to a second user 10*b*. The path 22 includes communication balloons 200*a* in a first plane 202*aa* linking to the communication balloons 200*a* in a second plane 202*ab*. The linking-gateway 330 is a moving boat 330*b* (FIG. 4A) or an airplane 330*c* (FIG. 4B). In some examples, not shown, the linking-gateway 330 is a ground gateway 300 (similar to the one shown in FIG. 3A). The communication path, as shown is as follows: source ground station 310, communication balloons 200*af*, 200*ag*, 200*ah*, 200*ai*, linking-gateway 330*b*, 330*c*, communication balloons 200*ad*, 200*ac*, 200*ab*, and destination ground station 320.

In some examples, all communication between a first user 10*a* and a second user 10*b* is via the system 100. However, in other instances, the first user 10*a* may request a communication 20 that is cached within one of the gateways 300 and the system 100, and thus the communication 20 (for instance, a user-requested video) is served from a cache at the nearby gateways 300.

As described in FIGS. 4A and 4B, the communication 20 travels from a first user 10*a* to a second user 10 via one linking-gateway 330 from a first group (e.g., plane 202) of balloons 200*a* to a second group (e.g., plane 202) of balloons 200*a*. However, in some implementations, the communication 20 travels through more than one linking-gateway 330, e.g., a second linking-gateway 330, to a third group (e.g., plane 202) of balloons 200*a*. This could be repeated as many times as necessary (i.e., multiple linking-gateways 330 linking balloons 200*a* located in different planes 202) to reach a final group of balloons 200*a*, which in turn sends the communication 20 to the destination ground station 320.

Figure 5:
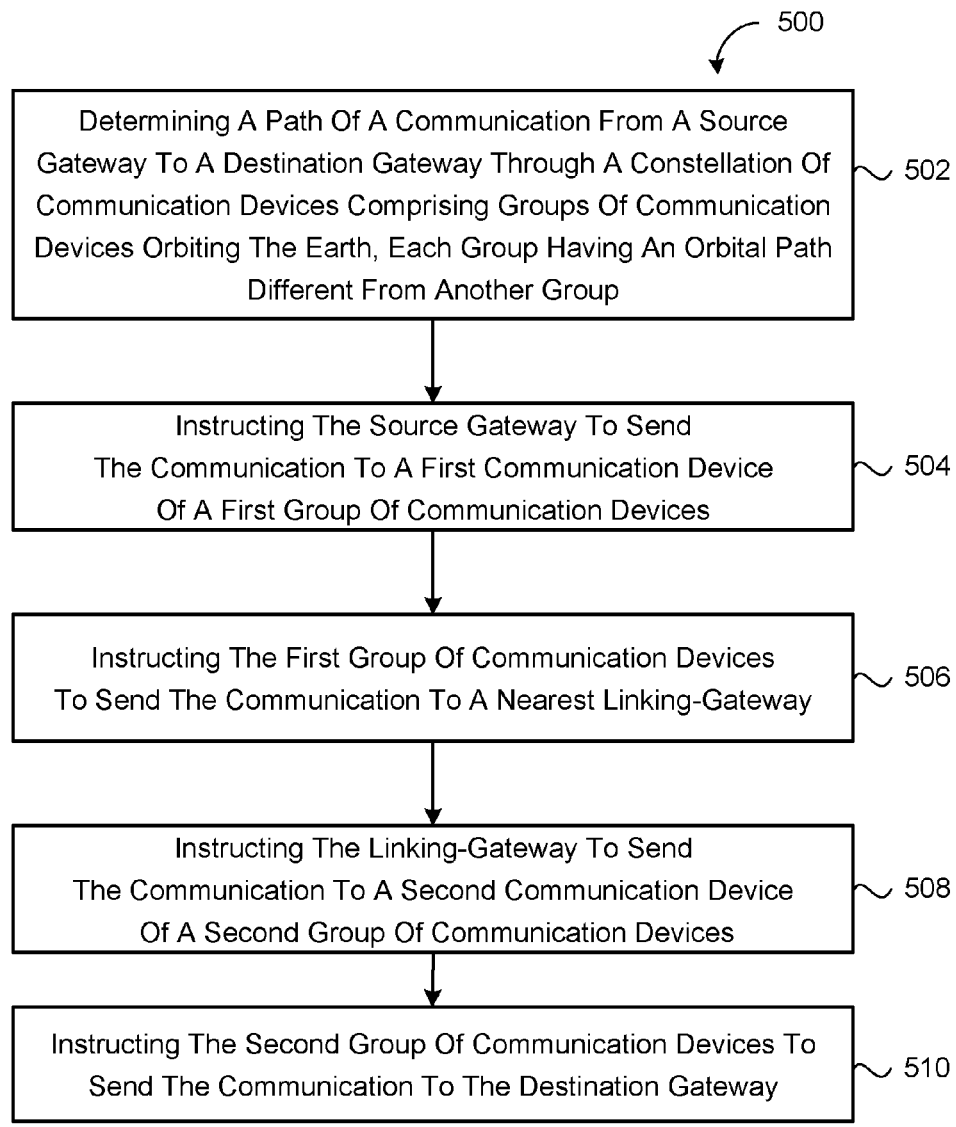
FIG. 5 is a schematic view of an exemplary arrangement of operations for communicating between two users.

Referring to FIG. 5, a method 500 of communication includes determining 502 a path 22 of a communication 20 from a source ground station 310 to a destination ground station 320 through a constellation of communication devices (e.g., HACDs 200, such as communication balloons 200*a* or satellites 200*b*) including groups (e.g., planes 202) of communication devices 200 orbiting the earth 30. Each group 202 has an orbital path or trajectory different from another group 202. The method 500 also includes instructing 504 the source ground station 310 to send the communication 20 to a first communication device 200 of a first group of communication devices 200 and instructing 506 the first group of communication devices 200 to send the communication 20 to a nearest linking-gateway 330. The method 500 further includes instructing 508 the linking-gateway 330 to send the communication 20 to a second communication device 200 of a second group of communication devices 200 and instructing 510 the second group of communication devices 200 to send the communication 20 to the destination ground station 320.

In some implementations, the method 500 includes determining the path 22 based on at least one of a border gateway protocol, a maximum flow problem, or a shortest path problem. Other factors may be used for determining the path as well. In some examples, the method 500 includes determining the path 22 based on a scoring function of one or more of a distance between the source ground station 310 and the destination ground station 320, a capacity of an inter-device link between two devices 200, an operational status of a communication device 200, and a signal strength of a communication device 200. The operational status of a communication device 200 may be an active status or an inactive status, where the method 500 includes avoiding inactive communication devices 200 while determining the communication path. In some examples, the source ground station 310 receives the communication 20 from a first user 10*a* and the destination ground station 320 transmits the communication 20 to a second user 10*b*. The linking-gateway 330 may be moving across the earth 30 (e.g., on a balloon, plane, train, automobile, boat, or other moving object). As such, the method 500 may include determining a position of the linking-gateway 330.

In some implementations, the method 500 further includes instructing a current communication device 200 with possession of the communication 20 to send the communication 20 to a forward or rearward communication device 200 within the orbital path or trajectory of the current communication device 200 and within the same group 202 of communication devices 200 as the current communication device 200. The method 500 may further include instructing the forward or rearward communication device 200 receiving the communication 20 to send the communication 20 to the linking-gateway 330. The source ground station 310 may receive the communication 20 from a first user 10a through a cabled or fiber optic or a wireless radio-frequency connection and the destination ground station 320 may transmit the communication 20 to a second user 10b through a cabled or fiber optic or a wireless radio-frequency communication; however, other modes of communication are possible as well. For example, users 10a, 10b may communicate with gateways 300, such as source and destination ground stations 310, 320 through wired, fiber optic, free-space optical, wireless communications or a combination thereof.

Various implementations of the systems and techniques described here can be realized in digital electronic circuitry, integrated circuitry, specially designed ASICs (application specific integrated circuits), FPGAs (field-programmable gate arrays), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit), or an ASIC specially designed to withstand the high radiation environment of space (known as "radiation hardened", or "rad-hard").

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A communication system comprising:
   a source ground station;
   a constellation of communication devices comprising groups of communication devices orbiting earth, each group having an orbital path or trajectory different from another group, a first communication device of a first group of communication devices in communication with the source ground station and receiving a communication from the source ground station;
   a linking-gateway in communication with at least the first group of communication devices and a second group of communication devices, the linking-gateway receiving the communication from the first group of communication devices and sending the communication to a second communication device of the second group of communication devices;
   a destination ground station in communication with the second group of communication devices, the destination ground station receiving the communication from a communication device of the second group of communication devices; and
   a data processing device configured to determine a communication path for the communication based on a border gateway protocol that requires the linking-gateway to periodically inform of topology changes, wherein the communication path is based on a direction and a distance between at least two communication devices along the communication path, the direction being a measure of a cost to reach the destination ground station.

2. The communication system of claim 1, wherein the border gateway protocol requires a routing table to be periodically updated and sent, the routing table including a destination network, a next router along a corresponding communication path, and the corresponding communication path to reach a corresponding destination ground station.

3. The communication system of claim 1, wherein the source ground station receives the communication from a first user through a cabled, fiber optic, radio-frequency wireless, or free-space optical connection and the destination ground station transmits the communication to a second user through a cabled, fiber optic, radio-frequency wireless, or free-space optical connection.

4. The communication system of claim 1, wherein the communication devices comprise communication balloons and/or satellites.

5. The communication system of claim 1, wherein the linking-gateway is moving across the earth.

6. The communication system of claim 1, wherein a current communication device having possession of the communication is in communication with a forward communication device within the orbital path or trajectory of its group of communication devices and a rearward communication device within the orbital path or trajectory of its group of communication devices via inter-device links, the current communication device, the forward communication device, and the rearward communication device within the same group of communication devices.

7. The communication system of claim 6, wherein after the first communication device receives the communication, the first communication device sends the communication via an inter-device link to the forward communication device or the rearward communication device, the communication device receiving the communication forwarding the communication to the linking-gateway.

8. The communication system of claim 7, wherein the data processing device is in communication with the source ground station, the constellation of communication devices, the linking-gateway, and the destination ground station, the data processing device determining the communication path of the communication from a source in communication with the source ground station to a destination in communication with the destination ground station.

9. A method of communication, the method comprising:
   determining, by data processing hardware, a communication path of a communication from a source ground station to a destination ground station through a constellation of communication devices based on a border gateway protocol, the constellation of communication devices comprising groups of communication devices orbiting earth, each group having an orbital path or trajectory different from another group, the border gateway protocol requiring the linking-gateway to periodically inform of topology changes, wherein the communication path is based on a direction and a distance between at least two communication devices along the communication path, the direction being a measure of a cost to reach the destination ground station;

instructing, by the data processing hardware, the source ground station to send the communication to a first communication device of a first group of communication devices;

instructing, by the data processing hardware, the first group of communication devices to send the communication to a nearest linking-gateway;

instructing, by the data processing hardware, the linking-gateway to send the communication to a second communication device of a second group of communication devices; and instructing, by the data processing hardware, the second group of communication devices to send the communication to the destination ground station.

10. The method of claim 9, wherein the border gateway protocol requires a routing table to be periodically updated and sent, the routing table including a destination network, a next router along a corresponding communication path, and the corresponding communication path to reach a corresponding destination ground station.

11. The method of claim 9, wherein the source ground station receives the communication from a first user and the destination ground station transmits the communication to a second user.

12. The method of claim 9, wherein the communication devices comprise communication balloons and/or satellites.

13. The method of claim 9, wherein the linking-gateway is moving across the earth.

14. The method of claim 13, further comprising determining or tracking a position of the linking-gateway.

15. The method of claim 14, further comprising:
instructing a current communication device having possession of the communication to send the communication to a forward or rearward communication device within the orbital path or trajectory of the current communications device and within the same group of communication devices as the current communication device; and
instructing the forward or rearward communication device receiving the communication to send the communication to the linking-gateway.

16. The method of claim 15, wherein the source ground station receives the communication from a first user through a cabled, fiber optic, radio-frequency wireless, or free-space optical connection and the destination ground station transmits the communication to a second user through a cabled, fiber optic, radio-frequency wireless, or free-space optical communication.

17. A communication system comprising:
a data processing device in communication with:
a source ground station;
a constellation of communication devices comprising groups of communication devices orbiting earth, each group having an orbital path or trajectory different from another group, a first communication device of a first group of communication devices in communication with the source ground station;
a linking-gateway in communication with the first group of communication devices and a second group of communication devices; and
a destination ground station in communication with the second group of communication devices,
wherein the data processing device is configured to perform operations comprising:
determining a communication path of a communication from the source ground station to the destination ground station through the constellation of communication devices and the linking-gateway based on a border gateway protocol that requires the linking-gateway to periodically inform of topology changes, wherein the communication path is based on a direction and a distance between at least two communication devices along the communication path, the direction being a measure of a cost to reach the destination ground station;
instructing the source ground station to send the communication to the first communication device of the first group of communication devices;
instructing the first group of communication devices to send the communication to the linking-gateway;
instructing the linking-gateway to send the communication to a second communication device of the second group of communication devices; and
instructing the second group of communication devices to send the communication to the destination ground station.

18. The communication system of claim 17, wherein the source ground station receives the communication from a first user through a cabled or fiber optic connection and the destination ground station transmits the communication to a second user through a cabled or fiber optic connection.

19. The communication system of claim 17, wherein the communication devices comprise high-altitude communication balloons or satellites.

20. The communication system of claim 17, wherein the linking-gateway is moving across the earth.

21. The communication system of claim 17, wherein a current communication device having possession of the communication is in communication with a forward communication device within the orbital path or trajectory of its group of communication devices and a rearward communication device within the orbital path or trajectory of its group of communication devices via inter-device links, the current communication device, the forward communication device, and the rearward communication device within the same group of communication devices.

22. The communication system of claim 21, wherein after the first communication device receives the communication, the first communication device sends the communication via an inter-device link to the forward communication device or the rearward communication device, the communication device receiving the communication forwarding the communication to the linking-gateway.

* * * * *